May 14, 1968     J. WILKINSON     3,382,953

DEFORMABLE ANNULAR BRAKE

Filed Feb. 4, 1965

Inventor
Jack Wilkinson
by Michael J. Striker

United States Patent Office 3,382,953
Patented May 14, 1968

3,382,953
DEFORMABLE ANNULAR BRAKE
Jack Wilkinson, Royton, England, assignor to Ernest
Scragg & Sons (Holdings) Limited
Filed Feb. 4, 1965, Ser. No. 433,250
Claims priority, application Great Britain, Feb. 4, 1964,
4,662/64
4 Claims. (Cl. 188—78)

ABSTRACT OF THE DISCLOSURE

A rotary member having an axis of rotation is provided with an axial recess bounded by an inner circumferential face. A deformable annular friction member comprising at least a portion received in the recess is provided on said portion with an outer circumferential face. This outer circumferential face circumferentially parallels the inner face of the rotary member with spacing therefrom. Actuating means is associated with the annular member and is operative for deforming the same and for thereby displacing the outer face substantially in its entirety into frictional engagement with the inner face bounding the recess.

---

This invention relates to textile apparatus and is particularly concerned with spindle brakes for such apparatus.

According to the invention a spindle brake has an annular friction means deformable so as frictionally to contact an inwardly-facing, circumferentially-extending surface of a spindle or of a part rotatable with a spindle, and means adapted to deform the friction means so that the friction means contacts the surface.

The annular friction means may have a gap and the deforming means is then operable to radially deform the friction means by widening the gap.

The friction means may be such as resiliently to oppose deformation.

The annular friction means may be of resin bonded fibrous material.

The annular friction means may surround a bolster adapted to receive a spindle.

The annular friction member may rest on a flange on a bolster adapted to receive a spindle. Said flange may be adapted to support said bolster in a spindle rail of a textile machine.

The deforming means may comprise a lever pivoted in a part of a bolster adapted to support a spindle.

The lever may be pivoted about a horizontal axis in a flange adapted to support the bolster in a spindle rail of a textile machine on which flange said annular friction means rests.

The invention also comprises, in combination, a spindle brake as above described and a spindle having an inwardly-facing, circumferentially-extending surface adapted to be engaged by the annular friction means when the latter means is deformed.

Figure 1:
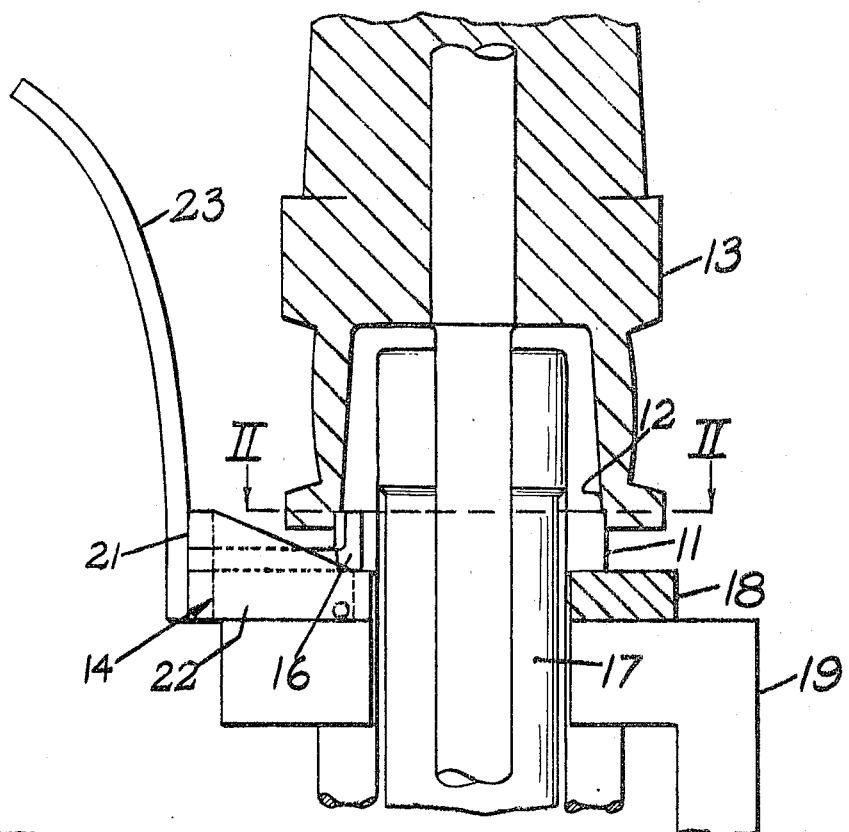
Figure 2:
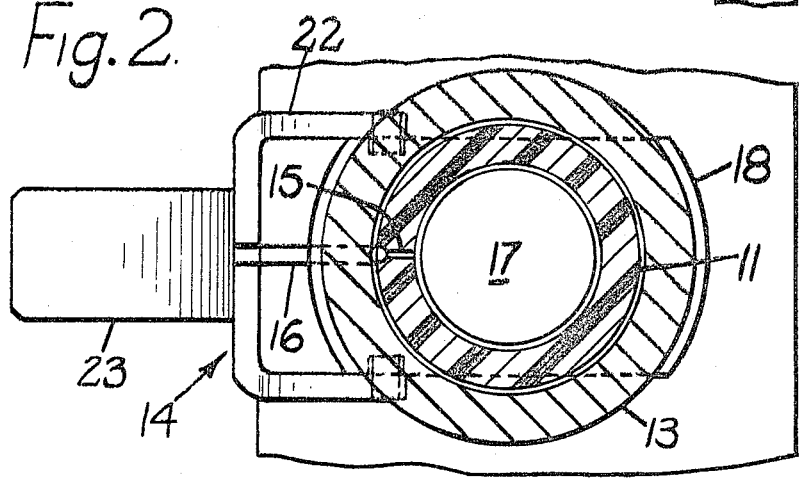

One embodiment of a spindle brake according to the invention will now be described with reference to the accompanying drawings in which:

FIGURE 1 is a sectional elevation, and
FIGURE 2 is a section on the line 2—2 of FIGURE 1.

The spindle brake comprises annular friction means in the form of a member 11 which is deformable so as to frictionally contact an inwardly-facing, circumferentially-extending surface 12 of a spindle 13, and means 14 adapted to deform the member 11 so that the latter member contacts the surface 12.

The member 11 has a gap 15 and the deforming means 14 comprises a member 16 adapted for radial movement to deform the member 11 by widening the gap 15.

The member 11 is such as resiliently to oppose deformation. The annular friction member 11 may be of a resin bonded fibrous material, for example, "Texolex" (registered trade mark) synthetic resin bonded cotton fabric.

The member 11 surrounds a bolster 17 adapted to receive the spindle 13. The member 11 rests on a flange 18 of the bolster 17 which is adapted to support said bolster 17 in a spindle rail 19 of a textile machine.

The expanding means 14 comprises a lever 21 pivoted by means of a yoke 22 about a horizontal axis in the flange 18. The lever 21 comprises a curved portion 23 which is adapted to be urged inwardly towards the spindle 13, and the spindle rail 19 may be located at a height such that the member 23 can be operated by the knee of an operator.

What I claim is:
1. A brake, particularly a spindle brake, comprising in combination, a rotary member having an axis of rotation and being provided with an axial recess bounded by an inner circumferential face; a deformable annular friction member provided with a substantially radial gap and comprising at least a portion which is received in said recess and which is provided with an outer circumferential face circumferentially paralleling said inner face with spacing therefrom; a bolster having a first portion extending through the aperture of said annular friction member, a second portion projecting outwardly of said aperture beyond one axial end of said annular member and received in said axial recess of said rotary member, and a flange extending radially of said first portion at the other axial end of said annular member, said annular member resting on said flange and being supported thereby; and actuating means associated with said annular member and operative for expanding said gap in circumferential direction of said annular friction member whereby to displace said outer face substantially in its entirety into frictional engagement with said inner face bounding said recess.

2. A brake as defined in claim 1, wherein said annular friction member consists of resiliently deformable material.

3. A brake as defined in claim 1, wherein said actuating means comprises an operating member and an expanding member associated with said operating member and operative for expanding said gap in circumferential direction of said annular friction member.

4. A brake as defined in claim 2, wherein said resiliently deformable material is a resin-bonded fibrous material.

References Cited

UNITED STATES PATENTS

| | | | |
|---|---|---|---|
| 653,692 | 7/1900 | Otto et al. | 188—78 |
| 2,320,565 | 6/1943 | Cabot | 188—78 X |
| 2,972,263 | 2/1961 | Hines. | |
| 3,219,154 | 11/1965 | Schenck et al. | 188—67 X |

DUANE A. REGER, *Primary Examiner.*